(12) United States Patent
Seki et al.

(10) Patent No.: US 12,097,961 B2
(45) Date of Patent: Sep. 24, 2024

(54) AIRCRAFT AIR CONDITIONING DEVICE

(71) Applicant: IHI Corporation, Tokyo (JP)

(72) Inventors: Naoki Seki, Tokyo (JP); Toshikazu Kobayashi, Tokyo (JP)

(73) Assignee: IHI Corporation, Tokyo (JP)

( * ) Notice: Subject to any disclaimer, the term of this patent is extended or adjusted under 35 U.S.C. 154(b) by 594 days.

(21) Appl. No.: 17/220,306

(22) Filed: Apr. 1, 2021

(65) Prior Publication Data
US 2021/0221521 A1  Jul. 22, 2021

Related U.S. Application Data

(63) Continuation of application No. PCT/JP2019/026767, filed on Jul. 5, 2019.

(30) Foreign Application Priority Data

Nov. 6, 2018 (JP) .................................. 2018-208876

(51) Int. Cl.
*B64D 13/08* (2006.01)
*B64D 13/06* (2006.01)

(52) U.S. Cl.
CPC ........ *B64D 13/08* (2013.01); *B64D 2013/064* (2013.01); *B64D 2013/0644* (2013.01); *B64D 2013/0648* (2013.01)

(58) Field of Classification Search
CPC .............. B64D 13/08; B64D 2013/064; B64D 2013/0644; B64D 2013/0648; B64D 13/06; Y02T 50/50
See application file for complete search history.

(56) References Cited

U.S. PATENT DOCUMENTS

| | | | | | |
|---|---|---|---|---|---|
| 2,618,470 | A | * | 11/1952 | Brown | F02C 6/06 |
| | | | | | 417/406 |
| 2,777,301 | A | * | 1/1957 | Kuhn | B64D 13/06 |
| | | | | | 417/381 |
| 2,961,939 | A | * | 11/1960 | Zissimos | B64D 13/06 |
| | | | | | 454/71 |
| 2,991,706 | A | * | 7/1961 | Best | B64D 13/00 |
| | | | | | 454/71 |
| 3,326,109 | A | * | 6/1967 | Basil | B64D 13/06 |
| | | | | | 454/71 |

(Continued)

FOREIGN PATENT DOCUMENTS

| | | | | | |
|---|---|---|---|---|---|
| CA | 2546714 | C | * | 9/2013 | ............. B64D 13/06 |
| CA | 2979829 | C | * | 7/2023 | ............. B64D 13/06 |

(Continued)

*Primary Examiner* — Ljiljana V. Ciric
(74) *Attorney, Agent, or Firm* — Oblon, McClelland, Maier & Neustadt, L.L.P.

(57) ABSTRACT

An aircraft air conditioning device provided in an aircraft includes: a plurality of base units each of which is provided with two electric compressors connected in series to an air flow path; a temperature controller which is configured to adjust a temperature of air discharged from a compressor of the two electric compressors; and a control device which is configured to control the plurality of base units and the temperature controller and each of the plurality of base units is configured to supply compressed air discharged from the temperature controller to an air-conditioned space as conditioned air.

7 Claims, 4 Drawing Sheets

(56) References Cited

U.S. PATENT DOCUMENTS

| | | | | |
|---|---|---|---|---|
| 3,711,044 | A * | 1/1973 | Matulich | B64D 13/06 454/72 |
| 4,091,613 | A * | 5/1978 | Young | F02C 6/08 60/785 |
| 4,262,495 | A * | 4/1981 | Gupta | B64D 13/06 62/89 |
| 4,419,926 | A * | 12/1983 | Cronin | B64D 13/06 454/74 |
| 4,445,342 | A * | 5/1984 | Warner | B64D 13/06 236/13 |
| 4,546,939 | A * | 10/1985 | Cronin | F04D 27/0261 454/74 |
| 4,684,081 | A * | 8/1987 | Cronin | B64D 13/06 244/53 A |
| 4,875,345 | A * | 10/1989 | Signoret | B64D 13/06 62/402 |
| 5,125,597 | A * | 6/1992 | Coffinberry | F02C 7/277 454/71 |
| 5,137,230 | A * | 8/1992 | Coffinberry | B64D 13/06 244/58 |
| 5,143,329 | A * | 9/1992 | Coffinberry | F02C 7/32 244/209 |
| 5,956,960 | A * | 9/1999 | Niggeman | B64D 13/06 60/785 |
| 5,967,461 | A * | 10/1999 | Farrington | B64D 13/06 454/115 |
| 6,216,981 | B1 * | 4/2001 | Helm | B64D 13/06 454/76 |
| 6,283,410 | B1 * | 9/2001 | Thompson | B64D 41/00 454/71 |
| 6,316,841 | B1 * | 11/2001 | Weber | F02C 7/32 62/331 |
| 6,526,775 | B1 * | 3/2003 | Asfia | B64D 13/06 62/401 |
| 6,681,592 | B1 * | 1/2004 | Lents | B64D 13/06 62/401 |
| 6,928,832 | B2 * | 8/2005 | Lents | B64D 13/06 62/401 |
| 7,207,521 | B2 * | 4/2007 | Atkey | B64D 41/00 244/58 |
| 7,380,749 | B2 * | 6/2008 | Fucke | H01M 8/04111 429/513 |
| 7,578,136 | B2 | 8/2009 | Derouineau et al. | |
| 7,607,318 | B2 * | 10/2009 | Lui | B64D 13/06 60/39.83 |
| 7,624,592 | B2 * | 12/2009 | Lui | B64D 13/06 62/402 |
| 7,687,927 | B2 * | 3/2010 | Shander | H02J 4/00 290/7 |
| 7,797,962 | B2 * | 9/2010 | Kresser | B64D 13/06 62/401 |
| 7,980,928 | B2 * | 7/2011 | Markwart | B64D 13/06 237/12.3 A |
| 8,016,228 | B2 * | 9/2011 | Fucke | B64D 41/00 244/58 |
| 8,439,306 | B2 * | 5/2013 | Wilmot, Jr. | B64D 13/06 62/239 |
| 9,003,814 | B2 * | 4/2015 | Zywiak | B64D 13/06 62/401 |
| 9,205,925 | B2 * | 12/2015 | Bruno | B64D 13/02 |
| 9,221,543 | B2 * | 12/2015 | Kelnhofer | B64D 13/08 |
| 9,254,920 | B2 * | 2/2016 | Zhou | F02C 6/08 |
| 9,783,307 | B2 * | 10/2017 | Bruno | B64D 13/06 |
| 9,840,333 | B2 * | 12/2017 | Bruno | B64D 13/06 |
| 10,035,602 | B2 * | 7/2018 | Bruno | B64D 13/08 |
| 10,384,785 | B2 * | 8/2019 | Bruno | B64D 13/04 |
| 10,450,074 | B2 * | 10/2019 | Stieger | F01D 15/10 |
| 10,457,399 | B2 * | 10/2019 | Bammann | B64D 13/06 |
| 10,526,092 | B2 * | 1/2020 | DeFrancesco | F04D 29/5826 |
| 10,611,487 | B2 * | 4/2020 | Behrens | B64D 13/06 |
| 10,662,960 | B2 * | 5/2020 | Ricordeau | B64D 13/02 |
| 10,731,501 | B2 * | 8/2020 | Bruno | F04D 25/04 |
| 10,858,113 | B2 * | 12/2020 | Klimpel | B64D 13/08 |
| 10,926,884 | B2 * | 2/2021 | Bruno | B64D 13/06 |
| 10,967,978 | B2 * | 4/2021 | Bammann | B64D 13/06 |
| 11,047,237 | B2 * | 6/2021 | Bruno | F02C 6/08 |
| 11,254,435 | B2 * | 2/2022 | Bruno | F01D 15/08 |
| 11,511,867 | B2 * | 11/2022 | Bruno | F04D 25/045 |
| 11,542,840 | B2 * | 1/2023 | Macdonald | F01K 7/32 |
| 11,661,198 | B2 * | 5/2023 | Behrens | F02C 7/12 62/402 |
| 11,673,673 | B2 * | 6/2023 | Bammann | B64D 13/06 62/89 |
| 11,719,118 | B2 * | 8/2023 | Lippold | F01D 15/10 415/177 |
| 11,827,370 | B1 * | 11/2023 | Freer | B64D 27/08 |
| 11,851,191 | B2 * | 12/2023 | Bruno | F25B 9/004 |
| 11,851,192 | B2 * | 12/2023 | Bruno | F25B 9/004 |
| 11,926,427 | B2 * | 3/2024 | Morrison | B60L 50/72 |
| 2003/0051492 | A1 * | 3/2003 | Hartenstein | B64D 13/06 62/402 |
| 2008/0264084 | A1 | 10/2008 | Derouineau et al. | |
| 2009/0117840 | A1 | 5/2009 | Kresser et al. | |
| 2013/0061611 | A1 * | 3/2013 | Dittmar | B64D 13/00 62/244 |
| 2014/0290287 | A1 | 10/2014 | Houssaye | |
| 2015/0307196 | A1 * | 10/2015 | Bruno | F02C 6/08 62/61 |
| 2016/0083100 | A1 * | 3/2016 | Bammann | B64D 13/06 62/89 |
| 2016/0347456 | A1 * | 12/2016 | Bruno | B64D 13/06 |
| 2019/0217960 | A1 * | 7/2019 | Behrens | B64D 13/06 |
| 2019/0359340 | A1 * | 11/2019 | Pachidis | B64D 13/06 |
| 2020/0398992 | A1 * | 12/2020 | Morrison | B60L 58/32 |
| 2021/0053687 | A1 * | 2/2021 | Bruno | B64D 13/06 |
| 2021/0229817 | A1 * | 7/2021 | Seki | B64D 13/08 |
| 2022/0348335 | A1 * | 11/2022 | Ho | B64D 13/06 |
| 2022/0355938 | A1 * | 11/2022 | Lavergne | B64D 13/06 |

FOREIGN PATENT DOCUMENTS

| | | | | |
|---|---|---|---|---|
| CA | 3115964 | C * | 9/2023 | B64D 13/06 |
| CN | 103057727 | A * | 4/2013 | |
| CN | 103256742 | A * | 8/2013 | |
| DE | 10234968 | A1 * | 2/2004 | B64D 13/06 |
| DE | 112007001611 | T5 * | 4/2009 | B64D 41/00 |
| EP | 1752377 | A2 * | 2/2007 | B64D 13/06 |
| EP | 2592001 | A2 * | 5/2013 | B64D 13/06 |
| EP | 3572329 | A1 * | 11/2019 | B64D 13/06 |
| EP | 3878749 | A1 * | 9/2021 | B64D 13/06 |
| ES | 2275045 | T3 * | 6/2007 | B64D 13/06 |
| FR | 2641824 | A1 * | 7/1990 | |
| FR | 2829464 | A1 * | 3/2003 | B64D 13/06 |
| FR | 2829466 | A1 * | 3/2003 | B64D 13/06 |
| JP | 2003-312594 | A | 11/2003 | |
| JP | 2004-142501 | A | 5/2004 | |
| JP | 2005-349912 | A | 12/2005 | |
| JP | 2006-231974 | A | 9/2006 | |
| JP | 2007-45398 | A | 2/2007 | |
| JP | 6134326 | B2 | 5/2017 | |
| JP | WO2020095477 | A1 * | 4/2021 | |
| JP | 6947313 | B2 * | 10/2021 | B64D 13/06 |
| RU | 2711842 | C1 * | 1/2020 | B64D 13/00 |
| WO | WO-2011124361 | A1 * | 10/2011 | B64D 13/06 |
| WO | WO-2016170141 | A1 * | 10/2016 | B64D 13/06 |

* cited by examiner

AIRCRAFT AIR CONDITIONING DEVICE

CROSS REFERENCE TO RELATED APPLICATIONS

The present application is a continuation application of International Application No. PCT/JP2019/026767, filed on Jul. 5, 2019, which claims priority to Japanese Patent Application No. 2018-208876, filed on Nov. 6, 2018. The contents of these applications are incorporated herein by reference in their entirety.

TECHNICAL FIELD

The present disclosure relates to an aircraft air conditioning device.

Patent Document 1 below discloses an aircraft system (aircraft air conditioning device) that supplies conditioned air, obtained by adjusting a temperature of compressed air generated by a compressor, to a cabin of an aircraft. This aircraft system includes a first compressor and at least one second compressor driven by a turbine and/or a motor and is configured to operate only the first compressor when an outside air pressure is high and operate the first compressor and the second compressor when the outside air pressure is relatively low. Patent Documents 2 to 4 below also disclose technologies relating to an aircraft air conditioning device.

DOCUMENTS OF THE RELATED ART

Patent Document

[Patent Document 1]
  Japanese Unexamined Patent Application, First Publication No. H2007-045398
[Patent Document 2]
  Japanese Unexamined Patent Application, First Publication No. H2004-142501
[Patent Document 3]
  Japanese Unexamined Patent Application, First Publication No. H2003-312594
[Patent Document 4]
  Japanese Unexamined Patent Application, First Publication No. H2005-349912

SUMMARY

Incidentally, it is common to provide two or three aircraft air conditioning devices in order to ensure redundancy. Each device is called an ECS (Environmental Control System) unit or Air Pack. The cabin is maintained in a predetermined pressure environment and temperature environment by operating two devices (or three devices) in parallel. However, since it is necessary to exhibit sufficient air conditioning performance even when any one of two devices (or three devices) stops operating, a large margin (about twice that during normal operation) is set for the supply capacity of the conditioned air. As a result, it is difficult to increase the number of devices, that is, to improve redundancy due to restrictions on installation space and weight.

The present disclosure has been made in view of the above-described circumstances and an object thereof is to provide an aircraft air conditioning device capable of increasing redundancy as compared with a conventional case.

In order to attain the above-described object, the present disclosure adopts an aircraft air conditioning device provided in an aircraft including: a plurality of base units each of which is provided with two electric compressors connected in series to an air flow path; a temperature controller which is configured to adjust the temperature of air discharged from a compressor of the two electric compressors; and a control device which is configured to control the plurality of base units and the temperature controller, wherein each of the plurality of base units is configured to supply compressed air discharged from the temperature controller to an air-conditioned space as conditioned air as a first aspect of the aircraft air conditioning device.

In the present disclosure, as a second aspect of the aircraft air conditioning device, in the first aspect, the control device may individually be configured to control two electric motors of the two electric compressors.

In the present disclosure, as a third aspect of the aircraft air conditioning device, in the first or second aspect, the two electric compressors and two turbines respectively axially coupled to the two electric compressors may constitute two electric turbochargers and the two turbines may recover energy from the conditioned air.

In the present disclosure, as a fourth aspect of the aircraft air conditioning device, in the third aspect, each of the plurality of base units may include a switch which is configured to change a connection relationship between the two turbines and the air-conditioned space in response to operation modes.

In the present disclosure, as a fifth aspect of the aircraft air conditioning device, in the fourth aspect, the control device may be configured to control the switch such that the conditioned air subjected to energy recovery by the two turbines is supplied to the air-conditioned space in a first operation mode of the operation modes corresponding to a state in which the aircraft is on the ground.

In the present disclosure, as a sixth aspect of the aircraft air conditioning device, in the fourth or fifth aspect, the two electric compressors may include a first electric compressor and a second electric compressor located on a downstream side of the first electric compressor in the air flow path, the two turbines may include a first turbine axially coupled to the first electric compressor and a second turbine axially coupled to the second electric compressor, and the control device may be configured to control the switch such that the conditioned air subjected to energy recovery by the second turbine is supplied to the air-conditioned space and the conditioned air collected from the air-conditioned space is supplied to the first turbine and operate the electric motor of the first electric compressor as a generator in a second operation mode of the operation modes corresponding to a state in which the aircraft in the sky (airborne).

According to the present disclosure, it is possible to provide an aircraft air conditioning device capable of increasing redundancy as compared with a conventional case.

DETAILED DESCRIPTION

Figure 1:
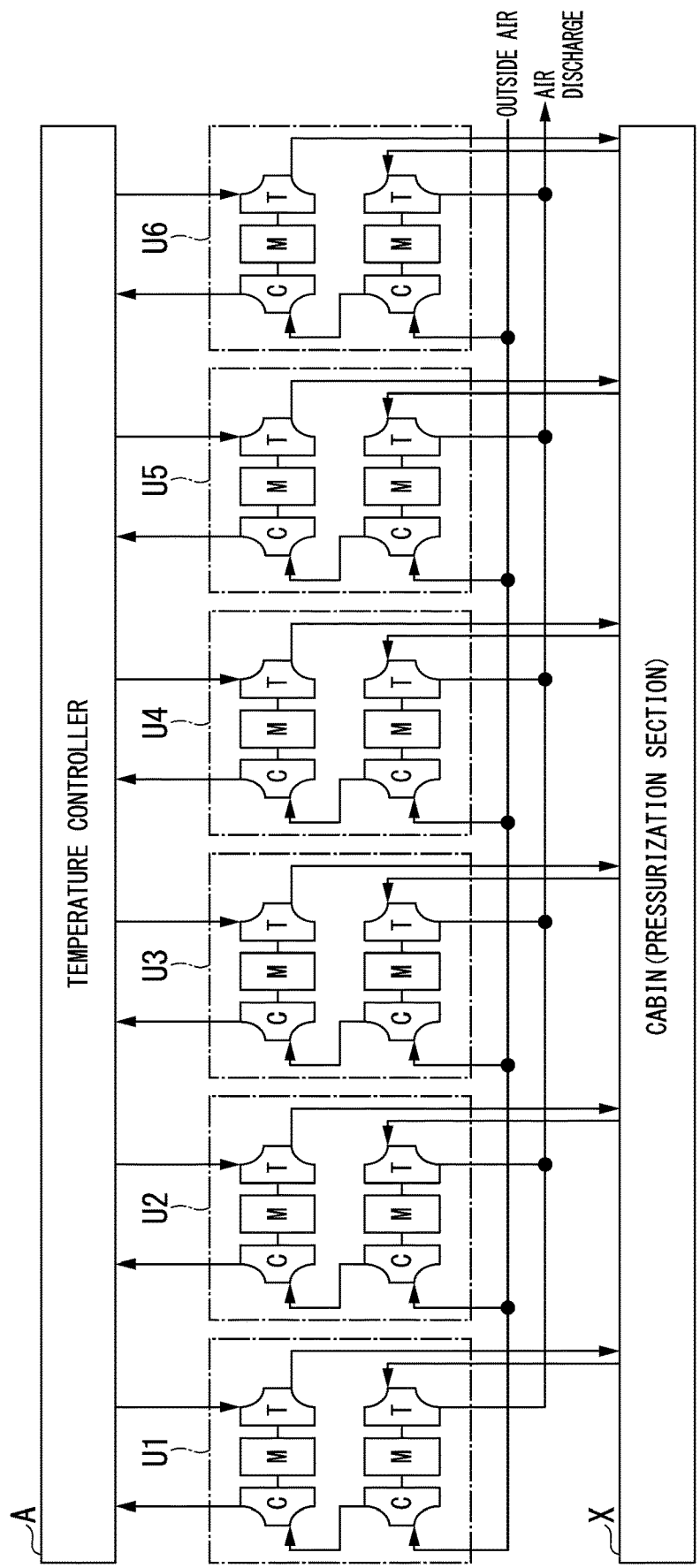
FIG. 1 is a schematic diagram showing a basic configuration of an aircraft air conditioning device according to an embodiment of the present disclosure.

Hereinafter, an embodiment of the present disclosure will be described with reference to the drawings. An aircraft air conditioning device according to this embodiment is an air conditioning device provided in an aircraft (passenger aircraft) and includes, as shown in FIG. 1, a plurality of base units U1 to U6, a temperature controller A, and an air conditioning control device S. The base units U1 to U6 compress (pressurize) outside air taken into the aircraft from the outside of the aircraft to a predetermined pressure, supply the air to a cabin X which is a pressurization section of the aircraft, and discharge the air collected from the cabin X to the outside of the aircraft.

Although six base units U1 to U6 are shown in FIG. 1, the number of base units may be any number as long as there are multiple units. Further, the cabin X is an air-conditioned space in this embodiment.

Figure 2:
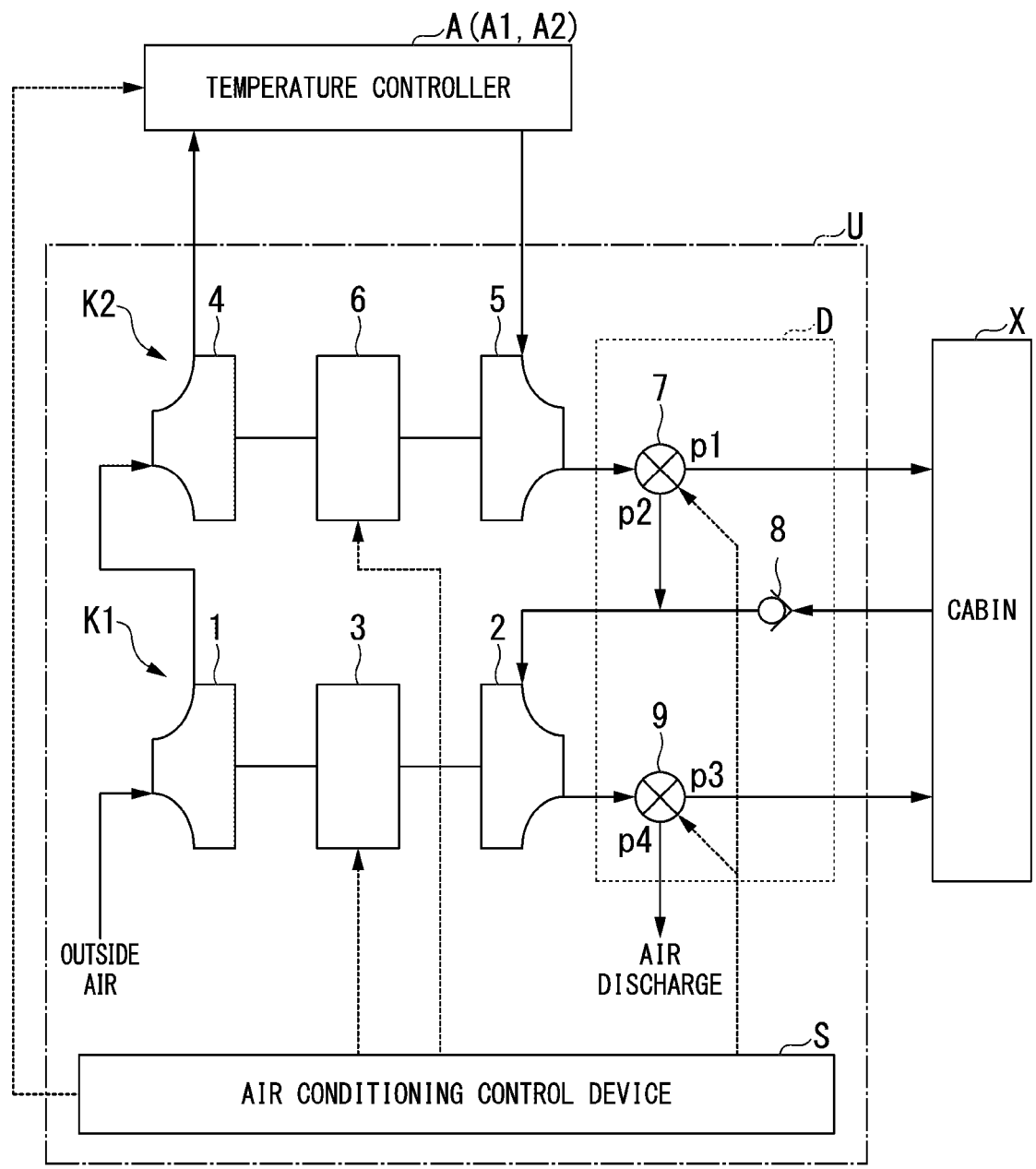
FIG. 2 is a block diagram showing a specific configuration of a base unit according to an embodiment of the present disclosure.

All the base units U1 to U6 have the same configuration and include, as shown in FIG. 2 a first turbocharger K1, a second turbocharger K2, a switch D, and an air conditioning control device S. Additionally, since all the base units U1 to U6 have the same configuration as described above, "U" is used as a generic reference for all the base units U1 to U6 in FIG. 2.

In such a base unit U, the first turbocharger K1 is an electric turbocharger which includes a first compressor 1, a first turbine 2, and a first electric motor 3 axially coupled to each other and rotationally drives the first compressor 1 by the power of the first turbine 2 and/or the first electric motor 3. This first turbocharger K1 compresses outside air in a first stage by the first compressor 1 and supplies the air to the second turbocharger K2. Additionally, the first compressor 1 and the first electric motor constitute a first electric compressor.

That is, in the first turbocharger K1, the first compressor 1 is a centrifugal compressor which is axially coupled to the first turbine 2 and the first electric motor 3 and is rotated by the power of the first turbine 2 and/or the first electric motor 3. This first compressor 1 compresses outside air in a first stage and supplies the air to the second turbocharger K2. The first turbine 2 is a power source which generates power by using compressed air input from the switch D as a working fluid and supplies the air subjected to power recovery to the switch D. The first electric motor 3 is a power source which generates power by being controlled and driven by the air conditioning control device S and rotationally drives the first compressor 1.

The second turbocharger K2 is an electric turbocharger which includes a second compressor 4, a second turbine 5, and a second electric motor 6 axially coupled to each other and rotationally drives the second compressor 4 by the power of the second turbine 5 and/or the second electric motor 6. This second turbocharger K2 compresses the compressed air (first-stage compressed air) input from the first turbocharger K1 in a second stage by the second compressor 2 and supplies the air to the temperature controller A. Additionally, the second compressor 4 and the second electric motor 6 constitute a second electric compressor.

That is, in the second turbocharger K2, the second compressor 4 is a centrifugal compressor which is axially coupled to the second turbine 5 and the second electric motor 6 and is rotated by the power of the second turbine 5 and/or the second electric motor 6. This second compressor 4 compresses the compressed air (first-stage compressed air) in a second stage and supplies the compressed air (second-stage compressed air) to the temperature controller A. The second turbine 5 is a power source which generates power by using compressed air (temperature-controlled compressed air) subjected to temperature adjustment input from the temperature controller A as a working fluid and supplies the temperature-controlled compressed air subjected to power recovery to the switch D. The second electric motor 6 is a power source which generates power by being controlled and driven by the air conditioning control device S and rotationally drives the second compressor 4.

That is, such a base unit U includes two electric turbochargers which are connected in series to an air flow path, that is, the first turbocharger K1 and the second turbocharger K2. More specifically, the first compressor 1 of the first turbocharger K1 and the second compressor 4 of the second turbocharger K2 are connected in series to the air flow path in which the outside air or the compressed air (the first-stage compressed air and the second-stage compressed air) flows. Additionally, the aircraft is provided with an inlet for taking in outside air from the outside of the aircraft into the aircraft and an outlet for discharging temperature-controlled compressed air from the inside of the aircraft to the outside of the aircraft and the air flow path is a flow path connecting the inlet and the outlet. Additionally, the number of inlets is not limited to one and the number of outlets is not limited to one.

The temperature controller A is a temperature control device which adjusts the temperature of the compressed air (the second-stage compressed air) input from the second turbocharger K2 to a predetermined temperature. This temperature controller A supplies the temperature-controlled compressed air to the second turbine 5. Such a temperature controller A includes, for example, a heat source A1 generating a heat medium at a predetermined temperature, and a heat exchanger A2 that exchanges heat between compressed air and the heat medium so that the compressed air is maintained at a predetermined temperature. The heat medium is, for example, outside air.

As shown in the drawing, the switch D includes a first switching valve 7, a check valve 8, and a second switching valve 9 and changes the connection relationship between the base unit U and the cabin X (the air-conditioned space) in response to the operation mode of the aircraft air conditioning device. That is, the first switching valve 7 is a control valve which is controlled to be opened and closed by the air conditioning control device S and includes one input port and two output ports. This first switching valve 7 selectively outputs the temperature-controlled compressed air input from the second turbine 5 to a first output port p1 communicating with the cabin X or a second output port p2 communicating with the first turbine 2. The temperature-controlled compressed air supplied from such a first switching valve 7 to the cabin X is the conditioned air of this embodiment.

The check valve 8 is an opening and closing valve which is provided between the second output port p2 of the first switching valve 7 and the cabin X and is automatically opened and closed in response to the pressure relationship therebetween. That is, this check valve 8 is opened only when the pressure of the cabin X becomes equal to or larger than a predetermined pressure with respect to the pressure of the second output port p2 of the first switching valve 7 and is maintained in a closed state in other cases.

The second switching valve 9 is a control valve which is controlled to be opened and closed by the air conditioning control device S and includes one input port and two output ports. This second switching valve 9 selectively outputs the temperature-controlled compressed air input from the first turbine 2 to a first output port p3 communicating with the cabin X or a second output port p4 communicating with the outside of the aircraft. The temperature-controlled compressed air which is supplied from such a second switching valve 9 to the cabin X is the conditioned air of this embodiment.

The air conditioning control device S is a control device which controls the base unit U and the temperature controller A. This control device is a computer including a CPU (Central Processing Unit), a memory such as a RAM (Random Access Memory) or a ROM (Read Only Memory), and a storage device such as an SSD (Solid State Drive) or a HDD (Hard Disc Drive). The aircraft air conditioning device according to this embodiment has two operation modes depending on the aircraft state, but the air conditioning control device S controls the base unit U and the temperature controller A in response to the operation mode.

Next, the operation of the aircraft air conditioning device with such a configuration will be described in detail with reference to FIGS. 3 and 4.

The above-described two operation modes are a ground/air-conditioned space energy non-recovery mode (first operation mode) and an airborne/air-conditioned space energy recovery mode (second operation mode). The first operation mode is an operation mode corresponding to a case in which the aircraft is on the ground, that is, the outside air pressure is relatively high. In contrast, the second operation mode is an operation mode corresponding to a case in which the aircraft is airborne, that is, the outside air pressure is relatively low. The air conditioning control device S controls the base unit U and the temperature controller A as below in response to the first operation mode or the second operation mode.

Figure 3:
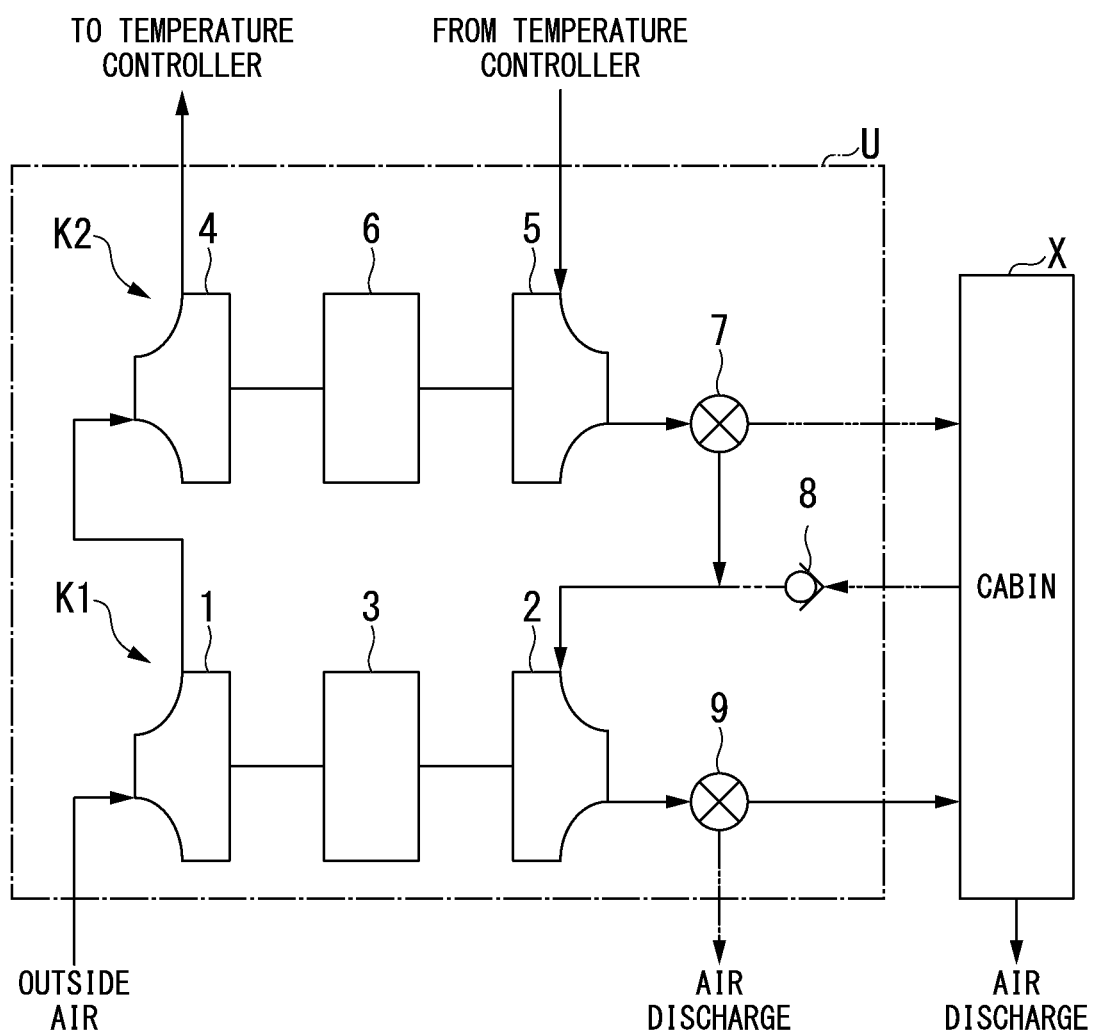
FIG. 3 is a schematic diagram showing a base unit state in a ground/air-conditioned space energy non-recovery mode (first operation mode) in an embodiment of the present disclosure.

FIG. 3 is a schematic diagram showing the state of the base unit U in the first operation mode. In the first operation mode, the air conditioning control device S operates the first electric motor 3 and the second electric motor 6 so that the first compressor 1 and the second compressor 4 are rotationally driven, the input port of the first switching valve 7 communicates with the second output port p2, and the input port of the second switching valve 9 communicates with the first output port p3. Additionally, in this case, since the pressure of the second output port p2 of the first switching valve 7 is sufficiently higher than the pressure of the cabin X, the check valve 8 is maintained in a closed state.

As a result, outside air is compressed by the first compressor 1 and the second compressor 4, is subjected to temperature adjustment by the temperature controller A, and is supplied to the second turbine 5 as temperature-controlled compressed air. Since this temperature-controlled compressed air functions as a working fluid in the second turbine 5, a part of the thermal energy of the temperature-controlled compressed air is subjected to power recovery by the second turbine 5 and assists the second electric motor 6 as an auxiliary power source. Then, the temperature-controlled compressed air subjected to power recovery is supplied to the first turbine 2 through the first switching valve 7.

Then, a part of the thermal energy of the temperature-controlled compressed air subjected to power recovery by the second turbine 5 is subjected to power recovery in the first turbine 2 and assists the first electric motor 3 as an auxiliary power source. Then, the temperature-controlled compressed air subjected to power recovery by the first turbine 2 is supplied to the cabin X through the second switching valve 9. Then, this temperature-controlled compressed air is discharged from the cabin X to the outside of the aircraft.

Here, this temperature-controlled compressed air may not be directly discharged from the cabin X to the outside of the aircraft, but the temperature-controlled compressed air discharged from the cabin X may be provided to cool a heating circuit such as a power converter. That is, an exhaust flow path provided between the cabin X and an outflow vale provided in the aircraft may be laid to pass through the heating circuit and the compressed air heated by cooling the heating circuit may be discharged to the outside of the aircraft.

Figure 4:
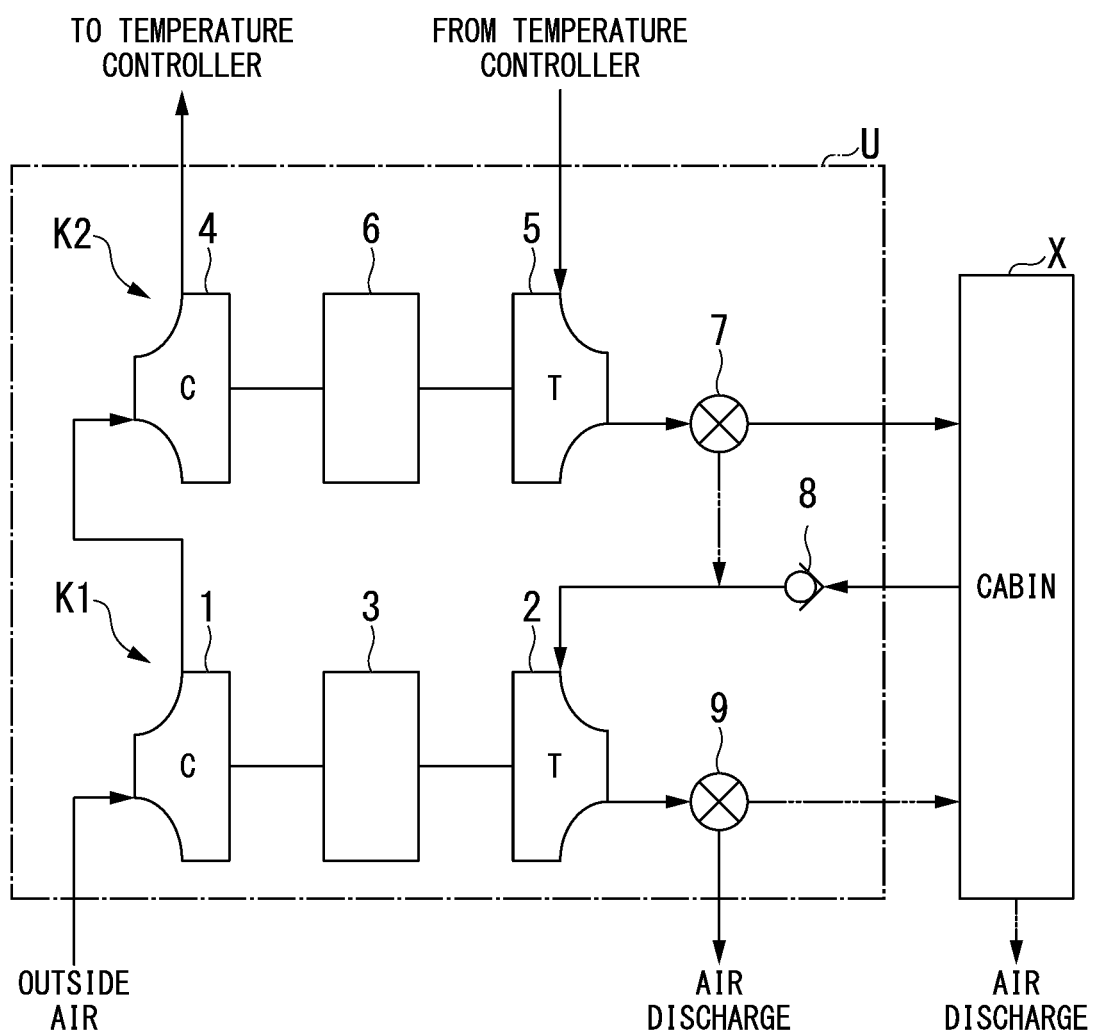
FIG. 4 is a schematic diagram showing a base unit state in an airborne/air-conditioned space energy recovery mode (second operation mode) in an embodiment of the present disclosure.

In such a first operation mode, FIG. 4 is a schematic diagram showing the state of the base unit U in the second operation mode. In the second operation mode, the air conditioning control device S operates the second electric motor 6 to rotationally drive only the second compressor 4. Further, the air conditioning control device S causes the input port of the first switching valve 7 to communicate with the first output port p1 and causes the input port of the second switching valve 9 to communicate with the second output port p4.

The compressed air temperature at the outlet of the second compressor 4 is much higher than a desired air temperature supplied to the cabin X regardless of whether the aircraft is on the ground or airborne. Here, when the aircraft is on the ground and the outside air temperature is high, it is difficult to sufficiently cool the air by the temperature controller A unless the compressed air temperature at the outlet of the second compressor 4 is raised by increasing the compression rate of the outside air. On the other hand, when the aircraft is airborne and the outside air temperature is much lower than that on the ground, it is possible to sufficiently cool the air by the temperature controller A even when the compression rate of the outside air is not raised to the same level as when the aircraft is on the ground. In the second operation mode, only the second electric motor 6 is operated to drive only the second compressor 4 in view of such circumstances.

In such a second operation mode, the first electric motor 3 does not function as a power source, and the first electric motor 3 functions as a generator, that is, an electric power source. In this case, since the pressure of the second output port p2 of the first switching valve 7 is sufficiently lower than the pressure of the cabin X, the check valve 8 is in an open state.

As a result, the outside air is compressed by the first compressor 1 and the second compressor 4, is subjected to temperature adjustment by the temperature controller A, and is supplied to the second turbine 5 as temperature-controlled compressed air. This temperature-controlled compressed air is subjected to power recovery by the second turbine 5 and assists the second electric motor 6 as an auxiliary power source. Then, the temperature-controlled compressed air subjected to power recovery is supplied to the cabin X through the first switching valve 7.

Then, the compressed air of the cabin X flows into the first turbine 2 through the check valve 8 and acts on the first turbine 2 as a working fluid to generate power. Then, the first electric motor 3 functions as a generator that is rotationally driven by the power of the first turbine 2 and generates electric power. Then, the compressed air subjected to power recovery discharged from the first turbine 2 is discharged to the outside of the aircraft through the second switching valve 9.

In such a second operation mode, the first electric motor 3 generates regenerative power by recovering a part of the thermal energy of the compressed air of the cabin X. In order to obtain more regenerative power, that is, further improve the energy recovery efficiency, it is preferable that the compressed air of the cabin X have greater thermal energy.

In view of such circumstances, in order to increase the thermal energy of the compressed air of the cabin X, for example, the compressed air of the cabin X may be provided to cool a heating circuit such as a power converter and the compressed air (heated compressed air) heated by the heating circuit, that is, the heated compressed air having thermal energy increased by the heating circuit may flow into the first turbine 2.

As described above, according to this embodiment, the aircraft air conditioning device provided in the aircraft includes the plurality of base units U1 to U6 each of which is provided with two electric compressors (the first compressor 1 and the first electric motor 3, and the second compressor 4 and the second electric motor 6) connected in series to the air flow path, the temperature controller A which adjusts the temperature of the air discharged from the compressor (the second compressor 4) of two electric compressors, and the control device S which controls the plurality of base units U1 to U6 and the temperature controller A, and each of the plurality of base units U1 to U6 supplies the compressed air discharged from the temperature controller A to the air-conditioned space X as the conditioned air. Further, the control device S individually controls two electric motors (the first electric motor 3 and the second electric motor 6) of two electric compressors (the first compressor 1 and the first electric motor 3, and the second compressor 4 and the second electric motor 6). Further, the two electric compressors, and two turbines (the first turbine 2 and the second turbine 5) respectively axially coupled to two electric compressors (the first compressor 1 and the first electric motor 3, and the second compressor 4 and the second electric motor 6) constitute two electric turbochargers K1 and K2, and the two turbines (the first turbine 2 and the second turbine 5) recover energy from the conditioned air. Further, each of the plurality of base units U1 to U6 includes the switch D which changes the connection relationship between the two turbines (the first turbine 2 and the second turbine 5) and the air-conditioned space X in response to the operation modes. Further, the control device S controls the switch D such that the conditioned air subjected to energy recovery by two turbines (the first turbine 2 and the second turbine 5) is supplied to the air-conditioned space X in the first operation mode which is the operation mode corresponding to a state in which the aircraft is on the ground. Further, the two electric compressors (the first compressor 1 and the first electric motor 3 and the second compressor 4 and the second electric motor 6) include the first electric compressor (the first compressor 1 and the first electric motor 3) and the second electric compressor (the second compressor 4 and the second electric motor 6) located on the downstream side of the first electric compressor (the first compressor 1 and the first electric motor 3) in the air flow path, two turbines (the first turbine 2 and the second turbine 5) include the first turbine 2 axially coupled to the first electric compressor (the first compressor 1 and the first electric motor 3) and the second turbine 5 axially coupled to the second electric compressor (the second compressor 4 and the second electric motor 6), and the control device S controls the switch D such that the conditioned air subjected to energy recovery by the second turbine 5 is supplied to the air-conditioned space X and the conditioned air collected from the air-conditioned space X is supplied to the first turbine 2, and operates the electric motor (the first electric motor 3) of the first electric compressor (the first compressor 1 and the first electric motor 3) as a generator in the second operation mode of the operation modes corresponding to a state in which the aircraft is airborne.

According to such an embodiment, since the base unit U compresses outside air by the cooperation of the first turbocharger K1 and the second turbocharger K2, a configuration in which not one electric turbocharger but two electric turbochargers (the first turbocharger K1 and the second turbocharger K2) are connected in series to the air flow path is adopted. Accordingly, the first turbocharger K1 and the second turbocharger K2 can be configured to have a relatively small size.

Thus, according to this embodiment, it is possible to install a larger number of base units U than the number of conventional devices without increasing the installation volume. Thus, it is possible to increase redundancy as compared with a conventional case without increasing the installation volume. Further, according to such an embodiment, it is possible to reduce the compression load of the first turbocharger K1 and the second turbocharger K2.

Further, according to this embodiment, the air conditioning control device S individually controls the first electric motor 3 of the first turbocharger K1 and the second electric motor 6 of the second turbocharger K2. Therefore, it is possible to easily change the sharing of the first compressor 1 and the second compressor 4. That is, it is possible to easily change the sharing of the first compressor 1 and the second compressor 4 without changing the flow rate of the air flowing into the first compressor 1 and the second compressor 4 by switching a pipe or the like. Accordingly, it is possible to easily handle a change in outside air pressure.

Further, according to this embodiment, energy is recovered from the compressed air of the cabin X in the second operation mode. Accordingly, it is possible to provide the aircraft air conditioning device with good energy efficiency.

Additionally, the present disclosure is not limited to the above-described embodiment and, for example, the following modified examples can be conceived. (1) In the above-described embodiment, a case in which the cabin X is the air-conditioned space has been described, but the present disclosure is not limited thereto. For example, in the case of an aircraft (freighter) that transports cargo which requires air conditioning, the cargo compartment in which the cargo is stored is the air-conditioned space. That is, the applicable aircraft of the present disclosure is not limited to a passenger aircraft and can be applied to various types of aircraft.

(2) In the above-described embodiment, the base unit U including two electric turbochargers, that is, the first turbocharger K1 and the second turbocharger K2 is adopted, but the present disclosure is not limited thereto. For example, the base unit including two electric compressors may be adopted. That is, the base unit including the first electric compressor having the first compressor 1 and the first electric motor 3 and the second electric compressor having the second compressor 4 and the second electric motor 6 can be adopted. Additionally, in this case, since power recovery is not performed by the first turbine 2 or the second turbine 5 at all, the compressed air output from the temperature controller A is directly supplied to the cabin X (the air-conditioned space) as the conditioned air and is discharged from the cabin X (the air-conditioned space) to the outside of the aircraft.

(3) In the above-described embodiment, the switch D including the first switching valve 7, the check valve 8, and the second switching valve 9 is adopted, but the present disclosure is not limited thereto. There may be various forms in the method of configuring the switch in the present disclosure.

(4) In the above-described embodiment, the temperature controller A is installed at the outlet of the second compressor 4, but another temperature controller B may be installed at the outlet of the first compressor 1.

In addition, the components in the above-described embodiment can be replaced with known components as appropriate without departing from the spirit of the present invention and the above-described modified examples may be appropriately combined.

INDUSTRIAL APPLICABILITY

According to the present disclosure, it is possible to provide an aircraft air conditioning device capable of increasing redundancy as compared with a conventional case.

What is claimed is:

1. An aircraft air conditioning device provided in an aircraft comprising:
   at least one memory storing instructions;
   at least one processor configured to execute the instructions;
   a plurality of base units each of which is provided with two electric compressors connected in series to an air flow path; and
   a temperature controller which includes
      a heat source generating a heat medium at a predetermined temperature; and
      a heat exchanger configured to
         exchange heat between air discharged from a compressor of the two electric compressors and the heat medium, and
         adjust a temperature of the air to a predetermined temperature,
   wherein the at least one processor is configured to control the plurality of base units and the temperature controller, and
   each of the plurality of base units is configured to supply compressed air discharged from the temperature controller to an air-conditioned space as conditioned air.

2. The aircraft air conditioning device according to claim 1,
   wherein the at least one processor is further configured to individually control two electric motors of the two electric compressors.

3. The aircraft air conditioning device according to claim 1, wherein
   each of the plurality of based units includes:
      the two electric compressors, and
      two turbines respectively axially coupled to the two electric compressors,
   the two electric compressors and the two turbines constitute two electric turbochargers, and
   the two turbines recover energy from the conditioned air.

4. The aircraft air conditioning device according to claim 3,
   wherein each of the plurality of base units includes a switch which is configured to change a connection relationship between the two turbines and the air-conditioned space in response to operation modes, the switch including:
      a first switching valve which includes: a first input port communicating with a first turbine of the two turbines; a first output port communicating with the air-conditioned space; and a second output port communicating with a second turbine of the two turbines,
      a check valve which is provided between the second output port of the first switching valve and the air-conditioned space, and
      a second switching valve which includes: a second input port communicating with the second turbine of the two turbines; a third output port communicating with the air-conditioned space; and a fourth output port communicating with an outside of the aircraft,
   the at least one processor is further configured to:
      control the first switching valve to be opened and closed such that the conditioned air input from the first input port is selectively output to the first output port or the second output port; and
      control the second switching valve to be opened and closed such that the conditioned air input from the second input port is selectively output to the third output port or the fourth output port, and
   the check valve is configured to be automatically opened and closed in response to a pressure relationship between the second output port and the air-conditioned space.

5. The aircraft air conditioning device according to claim 4,
   wherein the at least one processor is further configured to control the switch such that the conditioned air subjected to energy recovery by the two turbines is supplied to the air-conditioned space in a first operation mode of the operation modes corresponding to a state in which the aircraft is on the ground.

6. The aircraft air conditioning device according to claim 5,
   wherein the two electric compressors include:
      a first electric compressor; and
      a second electric compressor located on a downstream side of the first electric compressor in the air flow path,
   wherein the two turbines include:
      a first turbine axially coupled to the first electric compressor; and
      a second turbine axially coupled to the second electric compressor, and
   wherein the at least one processor is further configured to control the switch such that the conditioned air subjected to energy recovery by the second turbine is supplied to the air-conditioned space and the conditioned air collected from the air-conditioned space is supplied to the first turbine and operate an electric motor of the first electric compressor as a generator in a second operation mode of the operation modes corresponding to a state in which the aircraft is airborne.

7. The aircraft air conditioning device according to claim 4,
   wherein the two electric compressors include:
      a first electric compressor; and
      a second electric compressor located on a downstream side of the first electric compressor in the air flow path,
   wherein the two turbines include:
      a first turbine axially coupled to the first electric compressor; and a second turbine axially coupled to the second electric compressor, and wherein the at least one processor is further configured to control the switch such that the conditioned air subjected to energy recovery by the second turbine is supplied to the air-conditioned space and the conditioned air collected from the air-conditioned space is supplied to the first turbine and operate an electric motor of the first electric compressor as a generator in a second operation mode of the operation modes corresponding to a state in which the aircraft is airborne.

* * * * *